July 3, 1962 D. E. KELLEY ETAL 3,042,603

THICKNESS MODIFYING APPARATUS

Filed May 26, 1959 2 Sheets-Sheet 1

INVENTORS
DONALD E. KELLEY
WILLARD H. MOLL
STUART L. PARSONS
GERALD F. PASCALE

BY Nelson E. Kimmelman
ATTORNEY

THICKNESS MODIFYING APPARATUS

INVENTORS
DONALD E. KELLEY
WILLARD H. MOLL
STUART L. PARSONS
GERALD F. PASCALE

BY Nelson E. Kimmelman
ATTORNEY

United States Patent Office 3,042,603

Patented July 3, 1962

3,042,603

THICKNESS MODIFYING APPARATUS

Donald E. Kelley, Glenside, Willard H. Moll, Lansdale, Stuart L. Parsons, Gwynedd Valley, and Gerald F. Pascale, Norristown, Pa., assignors, by mesne assignments, to Philco Corporation, Philadelphia, Pa., a corporation of Delaware Filed May 26, 1959, Ser. No. 815,938
6 Claims. (Cl. 204—228)

This invention relates to semiconductor fabrication systems and in particular to apparatus and methods for producing transistors having a region of controlled thickness.

While the use of transistors and similar semiconductive devices has grown at a rapid rate within the last decade, even greater use thereof has been somewhat curtailed by their manufacturing costs. Though the price of transistors has been reduced on numerous occasions since their introduction, it still is appreciably higher than the price of conventional vacuum tubes having similar parameters. One reason why this is so resides in the fact that the extreme precision of assembly and construction required for transistors has not made them as readily subject to mass-production or automated techniques as vacuum tubes are.

One of the more critical steps required for the production of certain types of transistors such as the so-called "surface barrier" types is controlling the thickness of the base. Hitherto, in the production of high-frequency transistors which operate up to a frequency range of about 60–100 mc., for example, the width of the base was successfully controlled with great precision by jet-etching the transistor blank for a time determined by the light transmissivity of the base. In this process a jet of etching material is directed against a predetermined region of the transistor blank while infrared or white light from an appropriate source is passed through the region being etched. Radiation-sensitive-detectors or transducers placed on the side of the blank opposite the source supply a signal to etch-time control circuits for cutting off the jet when a predetermined amount of the radiation is transmitted through the region, the amount of radiation transmitted being a known function of the thickness of the base-material. Such systems are described and claimed in U.S. Patents 2,875,140 and 2,875,141 issued to T. V. Sikina and Robert N. Noyce respectively on Feb. 24, 1959, both of which have been assigned to the assignee hereof.

Base width control by such radiation transmission techniques have been found extremely useful and practical in the fabrication of transistors requiring very close emitter-to-collector spacing, i.e. which require very thin bases on the order of say .15 mil. However, such techniques are not as practical for transistors intended to operate in somewhat lower frequency ranges. The latter transistors may have base thicknesses on the order of .4 mil, for example, so that insufficient radiation would be transmitted to make the use of this technique practical.

It is accordingly a prime object of the present invention to provide novel apparatus and corresponding methods for producing regions of controlled thickness in semiconductive bodies.

Another object of the invention is to provide novel apparatus and corresponding methods for producing transistors having bases of a predetermined thickness.

Still another object of the invention is to provide apparatus and corresponding methods for producing relatively thick base regions in transistors made from semiconductive blanks of different thicknesses.

Another object of the invention is to provide novel apparatus and corresponding methods for etching transistor base regions of relatively large thicknesses as part of an automated transistor production system.

According to our invention we provide means for gaging the precise thickness of a predetermined region of blanks of a semiconductive material and means for developing a voltage whose amplitude closely corresponds to the measured thickness. We also provide means for storing the developed voltage capacitively and for subsequently subjecting the measured region of the blank to jet-etching for an interval whose duration is determined by the discharge time of the capacitive storage means. By controlling rigidly the length of the jet-etch process, the thickness of the measured region is thereby precisely determined.

*Operation of Station "A"*

Figure 1:
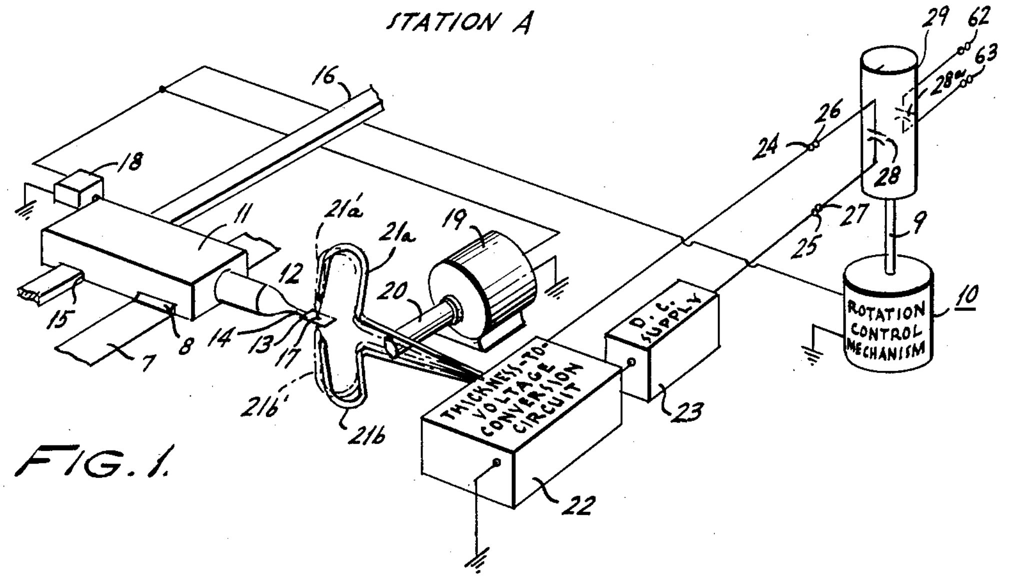
FIGURE 1 is a schematic and perspective view of the voltage derivation and storage operations according to our invention.

Referring to FIGURE 1, the first part of our invention is accomplished in a first processing stage which is termed hereinafter "Station A." Here a voltage proportional to the thickness of a predetermined region in each blank of the semi-conductive base material is derived and stored as will now be explained.

In one embodiment of the present invention, the various aspects thereof have been accomplished in an automated system certain aspects of which will be described herein solely as exemplary of a typical environment in which the invention has proved successful. In the system shown in FIGS. 1 and 2 the transistor blanks are automatically moved from one automatically-controlled processing station to the next by means of a number of "carriers" such as the carrier 11 which has a chuck portion 12 which is manually adjusted to hold a tab 14 to which a base blank 13 of germanium, for example, is soldered. The blank 13 has a thickness which has been determined to fall within the desired range 3.5–5 mils. The carrier 11 has a groove 15 which rides on a rail or track 16 as carrier 11 is transferred by means such as a moving belt 7 with brackets 8 from station to station. Of course, other transport means may be utilized if desired without departing from the principles of the invention.

When the carrier 11 is moved into Station A, it depresses the button of a conventional switch 18. Before the switch 18 is actuated the shaft 20 of motor 19, which has an oval cross-section, levers the probes or gage-heads **21*a* and 21*b* apart as shown in the solid line depiction. Upon actuation of the switch 18, the shaft 20 is rotated 90° by the motor 19 so that the gage-heads approach one another and make contact with a region 17 (hereinafter termed the "master index") on opposite sides of the blank 13 as shown in phantom at 21*a*' and 21*b*'. The actuation of the switch 18 also initiates the positioning of turret 29** as will be explained below.

The gage-heads **21*a* and 21*b* are connected to a thickness-to-voltage conversion circuit 22 which may comprise any conventional circuit for producing a voltage corresponding to the separation of the ends of the probes 21*a* and 21*b***. One circuit which has been used successfully includes two differential transformers each containing primary and secondary windings. One of the windings is connected to a source of an oscillatory wave at say, 5 kc., whereas the other winding is connected to an A.-C. amplifier. To each probe a core is coupled which, as the probe moves upward or downward, varies the coupling of the 5 kc. signal from the winding connected to the source to the winding connected to the A.-C. amplifier so that the corresponding 5 kc. wave induced in the latter winding will have a corresponding amplitude and phase. The latter wave will be amplified by the A.-C. coupled amplifier therein. The amplified 5 kc. wave is then synchronously detected by the 5 kc. signal supplied to the primary windings. The synchronously detected output (D.-C.) wave of the amplifier associated with probe *21a* is then combined algebraically with its counterpart from the amplifier associated with probe *21b* thereby producing a combined D.-C. output signal.

The differential transformers are so adjusted that if the thickness of the blank at the master index is gaged at exactly 4 mils, the combined D.-C. signal will be zero; when it is more or less than 4 mils the combined signal will be correspondingly positive and negative and will have an amplitude indicative of the extent of the deviation. The sensitivity of the conversion circuit 22 may be, for example, of the order of 2½ volts per mil. Circuit 22 also preferably contains a switch for opening up the input circuit of capacitor 28 after it has been charged up.

As indicated, the combined voltage produced by circuit 22 indicates a deviation from a norm (4 mils thickness) not an absolute quantity. A reference voltage indicative of the norm itself must also be provided which, when combined with the deviation-representative signal of circuit 22, will give a voltage representing the specific thickness of the measured region. This reference voltage is supplied by the D.-C. power supply 23 which is in series with the output of circuit 22. Power supply 23 is adjusted to produce a D.-C. reference level corresponding to the 4 mil reference thickness. The reference D.-C. level and the deviation-representative D.-C. signal are thus added together. The combined D.-C. signals appear at the output terminals 24 and 25.

In accordance with our invention when a voltage representative of the thickness of the master index is derived as explained above, it is stored for use at a later processing stage. Hence, when the probe measurement of the blank 13 is taking place, a storage turret 29 containing capacitors 28 and *28a* is positioned to receive the voltage derived from conversion circuit 22 and supply 23. To position the turret 29 thusly, the switch 18 may also be made to actuate a rotation control mechanism indicated schematically at 10 at the same time that the gage-heads start to come together. The purpose of the mechanism 10 is to cause a shaft 9 fixedly attached to the turret 29 to rotate so that the terminals 26 and 27 of the capacitor 28 mounted thereupon are in contact with the terminals 24 and 25. The mechanism 10 may, for example, comprise any one of numerous conventional stepped-motor arrangements which are constructed to rotate the turret 29 by 180° to its next indexed position using ratchets, detents, or their equivalents, for example. It will be noticed that when terminals 26 and 27 are coupled to terminals 24 and 25, the terminals of another capacitor *28a* located on the opposite side of the turret 29, are in contact with terminals 62 and 63 which are the input terminals of the etch-time control circuit 30. Since, as stated previously, actuation of the switch 18 has caused the turret 29 to rotate to the position shown in FIG. 1, it is ready to receive the combined D.-C. voltage from circuits 22 and 23 via terminals 24 and 25. The capacitors 28 and *28a* preferably are high quality precision capacitors such as are manufactured by the Condenser Products Company under the name of "Glassmikes." With the charging of capacitor 28 the operation of Station A is completed.

*Operation of Station B*

Figure 2:
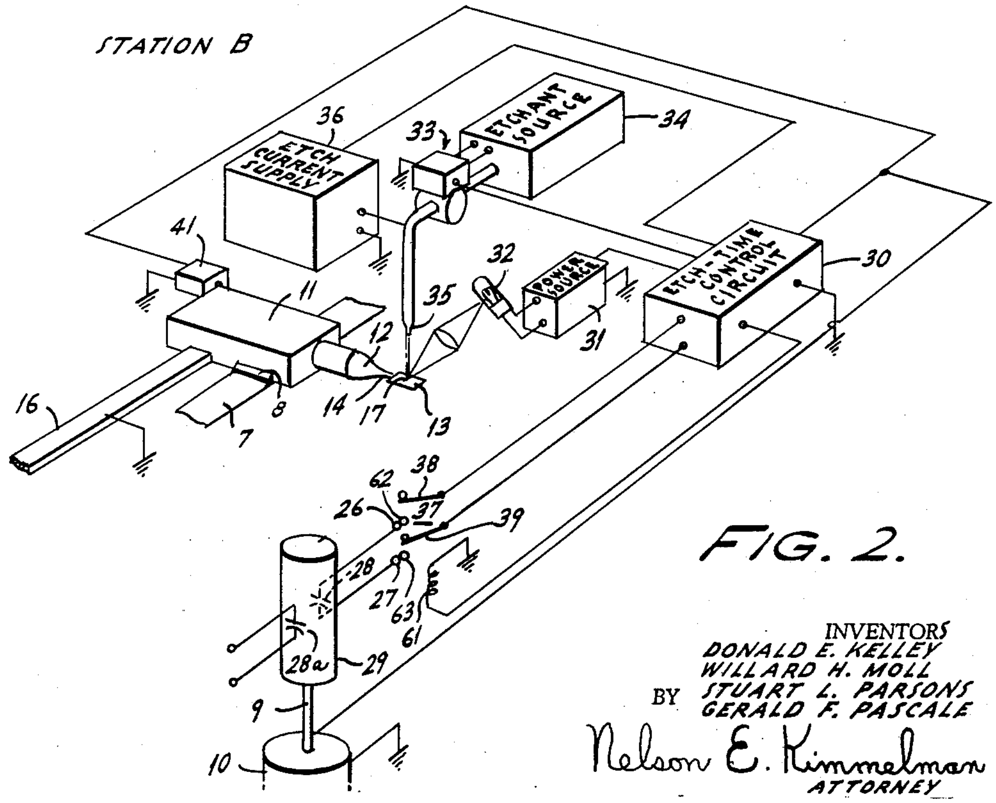
FIGURE 2 is a schematic and perspective view of the stored voltage "read-out" operation whereby the reduction of the blank thickness is effected in accordance with our invention.

Once the capacitor 28 has been charged by the combined voltages at terminals 24 and 25 the input circuit to the capacitor 28 is opened, as has been stated before, and the carrier 11 is moved along track 16 by belt 7 to a subsequent processing station. It will be assumed that the next station, "Station B" as shown in FIG. 2, is the one in which the stored D.-C. voltage is "read-out" to control the duration of the subsequent base-etching operation and, thereby, the thickness of the base in accordance with our invention.

When the carrier 11 has been moved along the track 16 into "Station B" it depresses the button of a switch 41 which causes the rotation mechanism 10 to rotate the turret 29 by 180° so that the terminals 26 and 27 of capacitor 28 now make contact with the contacts 62 and 63 of the relay 37. Switch 41 also initiates at the same time the operation of the etch-time control circuit 30 which then turns on the power source 31 which energizes the light bulb 32 and, simultaneously, opens the valve 33, which may be solenoid controlled, for example, so that the etchant (etching fluid) from the etchant source 34 is discharged as a jet of liquid through the nozzle 35 onto the master index 17 of the blank 13. Etching does not immediately proceed, however, as the required etching current has not been applied. After a short delay, the control circuit 30 turns on the etching current supply 36 which is coupled between the nozzle 35 and the grounded blank 13. At the same instant, the control circuit 30 energizes the coil 61 of the relay 37 causing the two armatures 38 and 39 thereof to connect with the contacts 62 and 63 which now make contact with the terminals 26 and 27 of the capacitor 28 as explained above.

When the capacitor 28 has been thus connected it begins to discharge through circuit 30 and when it is completely discharged the circuit 30 turns off the jet, the light and the etching current in a manner to be explained below in connection with the explanation of FIG. 3. Since the duration of etching is a function of the discharge time which, in turn, is a function of the gaged thickness of the blank 13, the blank 13 will be found to have an etched base region of the desired thickness when Station B has concluded its processing.

*Detailed Operation of the Etch-Time Control Circuit 30*

Figures 3, 4:
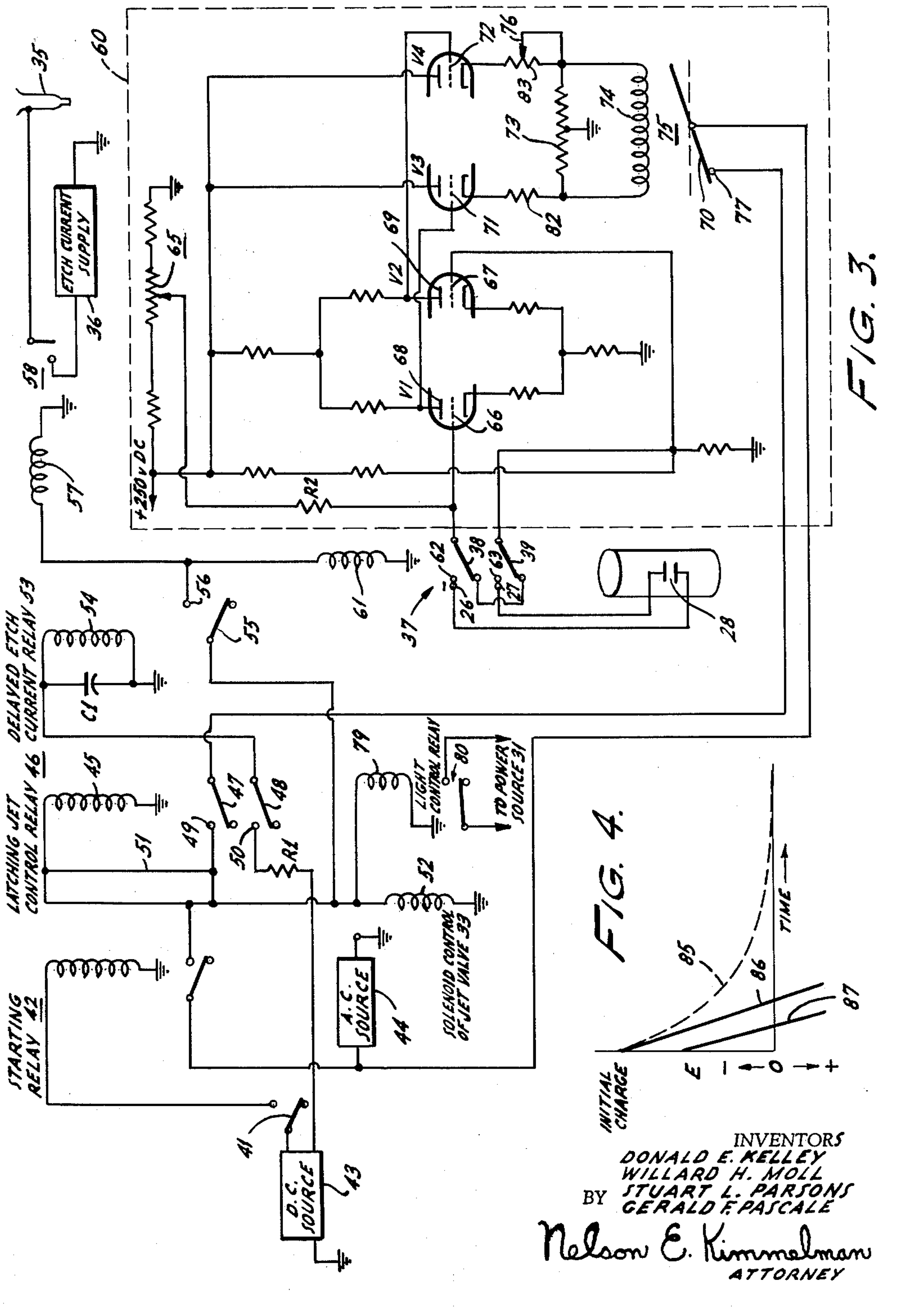
FIGURE 3 is a schematic diagram of the etching-time control circuit shown in FIG. 2.
FIGURE 4 is a graph illustrative of the operation of the circuit of FIG. 3.

FIGURE 3 is a schematic diagram of one possible circuit which has been used with excellent results as the etch-time control circuit 30. There are, doubtless, many other circuits that would also serve to control accurately the etching-time as a function of the discharge time of the capacitor 28.

When the carrier 11 momentarily actuates the switch 41 the coil of starting relay 42 is momentarily energized by D.-C. from the source 43. The relay 42 closes momentarily whereupon A.-C. from the source 44 passes through the winding 45 of the latching jet control relay 46. Consequently the armatures 47 and 48 of the relay 46 come into contact with the contacts 49 and 50. Although the switch 41 has been actuated only momentarily, the closing of the relay 46 causes the establishment of an A.-C. path through winding 45, through the armature 47 which makes contact with contact 49, through the armature 70 (shown in its "normal" position) of a polarized relay 75 and thence to the "hot" side of the A.-C. source 44. Consequently, once the armature 47 closes on contact 49 the A.-C. source 44 will continue to energize the coil 45 and the relay 46 will remain closed. Thus A.-C. will also continue to flow from the A.-C. source 44 through the polarized relay 75 and the armature 47, and through the solenoid 52 which is part of the jet valve 33. The valve 33 will therefore open to permit the etchant to flow through the nozzle 35 onto the master index portion 17 of the transistor blank 13 as explained previously.

Another result of the closing of relay 46 is that a steady A.-C. current through winding 79 as well as through winding 52 is produced since they are in parallel. Thus the light control relay 80 will close thereby turning on the power from the source 31 to cause the light bulb 32 to be illuminated.

The closing of the latching relay 46 also has a third, though delayed effect, namely the actuation of the etch current supply 36 shown in FIG. 3. When the armature 48 touches contact 50 D.-C. from the source 43 will flow, via a delay circuit comprising precision resistor R1 and a capacitor C1, through the coil 54 of the delayed etch current relay 53. Hence, shortly after the latching relay 46 closes, the relay 53 closes and A.-C. is supplied from the source 44 via polarized relay 75, the armature 47, and armature 55 of the closed relay 53, to the winding 57 whereupon the relay 58 closes and etching current from the supply 36 is applied between the nozzle 35 and the carrier 11 which is grounded to the track 16. The application of this current enables the actual etching of the blank 13 to begin.

When relay 58 closes, so does relay 37 since they are in parallel so that the terminals 26 and 27 of the storing capacitor 28 are switched into the input of the etch-time control circuit 30. The latter circuit includes a subcircuit which may be termed the "read-out" circuit. This subcircuit which is shown in the dashed-line rectangle 60, controls the discharge of the capacitor 28 and thereby determines how long the jet-etching of the blank 13 will continue.

The circuit 60 comprises a two stage direct-coupled amplifier circuit for driving a polarized relay 75 which is so adjusted, in a manner to be explained below, that its armature 70 normally makes contact with contact 77. In this position, A.-C. may continuously be supplied to the coil 45 to maintain the latching action of relay 46 even after the switch 41 opens. Furthermore, so long as relay 75 is closed, A.-C. can be supplied to the windings 52 and 79 as has already been explained. When the relay 75 opens, however, the relay 46 is unlatched since A.-C. is no longer applied to the coil 45. When relay 46 opens the jet is turned off by solenoid control 52, the etch current is turned off by the opening of relay 53, and the light 32 is extinguished by the opening of the power source relay 80. Thus, while it is the actuation of the switch 41 which initiates, after a short delay, the etching action, it is the read-out circuit 60, in cooperation with the capacitor 28, which terminates the etching action. How this circuit 60 operates will now be set forth in detail.

When the relay 37 is open, the armatures 38 and 39 and hence the grids 66 and 67 are shorted. In this state, current flows equally through V1 and V2 causing their plates 68 and 69 and the directly-coupled grids 71 and 72 to be at the same potential. The cathodes of V3 and V4 have respective load resistors 82 and 83, the latter being a potentiometer having a slider 76, and a common resistor 73 which is midtapped to ground. The fixed resistive element of potentiometer 83 has a resistance greater than that of resistor 82. Across the resistance 73 the coil 74 of the polarized relay 75 is connected.

If the slider 76 were positioned so that resistors 82 and 83 had the same resistance, equal and opposite currents would flow through resistor 73 and through the coil 74 whereupon the armature 70 would be in the "open" position as shown by the dotted line. However, the slider 76 is positioned so that potentiometer 83 has a resistance greater than that of resistor 82. As a result more current flows through V3 than through V4, causing the armature 70 to close into contact with contact 77 as shown.

When the terminals 26 and 27 of the capacitor 28 are switched into the circuit 60 by the closing of the relay 37, capacitor 28 is connected to the control grids of both amplifying tubes V1 and V2. If it is assumed that terminal 26 is negative whereas terminal 27 is positive, the charge on capacitor 28 will begin to leak off toward B+. The duration of the discharge interval will be determined primarily by the amplitude of the stored charge, the value of the capacitor 28 and of the precision resistor R2 (and to a much smaller extent by the resistance of the potentiometer 65 between the slider and the B+ terminal), and the voltage at the slider. The discharge flow will at first cause the potential on the grid 66 to go negative thereby causing the plate 68 to go correspondingly positive. Since there is D.-C. coupling between the tubes V1 and V2 and the tubes V3 and V4, the grid 71 will accordingly go more positive so that current through V3 will increase. Thus the net current flow through coil 74 will continue to be in the same direction and the relay 75 is maintained closed.

When the capacitor 28 has been completely discharged the potential on both grids is the same, i.e., zero, and since equal currents will flow through V1 and V2, as was the case when these grids 66 and 67 were shorted. relay 75 will remain closed.

However, when the B+ supply just begins to charge the capacitor 28 in the opposite direction, the current through V1 increases in amplitude relative to that in V2 causing, in turn, the current through V3 to be smaller than that in V4 with the result that the net flow of the cathode currents through coil 74 reverses and the armature 70 no longer touches contact 77 whereupon relay 46 opens and the jet-etching process comes to a halt.

FIGURE 4 is a graph which illustrates why a circuit which discharges the capacitor toward a positive voltage as shown in FIG. 3 was employed rather than one in which a capacitor is caused to discharge to zero. With the latter type the decrease of charge in the storage capacitor would be as shown by the dashed-line curve 85. It will be noted that its slope near the zero level is extremely gradual and thus the point at which it reaches zero is almost indeterminate. On the other hand, if the stored charge is discharged toward a positive voltage, as shown by the solid line 86, the point at which it crosses the zero line is clear and definite. Curve 87 shows the effect of a lower charging voltage on the beginning point of the discharge curve and how the discharge interval is shortened commensurately.

*General Remarks*

A word is in order about the relation of the linearity parameter of the jet-etching process, i.e., the pit depth-vs.-etch-time characteristic, to the derivation of the thickness-representative voltage. It is known that as the jet proceeds to go deeper into the etched pit, the rate at which it removes metal decreases due to the fact that the pit becomes rounded-off. This increases the area of contact of the etchant thereby reducing the current density. This non-linear removal characteristic may be approximated by using, as mentioned above in connection with FIGURE 1, a reference D.-C. voltage representing the time required to etch the base of a blank of known thickness to a nominal depth and combining it with another D.-C. voltage representing the difference in the time required, calculated from the reference thickness time, to etch to the actual depth desired. Of course, if the rate of metal removal can be made linear, the thickness-representative voltage can be made from just one linear component. In any case, it is understood that the rate of removal by the etchant should be standardized so that the jet's parameters are reproducible and predictable.

The invention has been described in terms of a turret having just two oppositely-situated capacitors, but of course, provision may be made for any desired number of them so that, as one blank is being gaged for thickness, a previously gaged blank is being etched in response to the read-out of a capacitor which has previously been charged.

While the invention has been explained herein as having great utility where relatively thick-base transistors are to be made, there is no reason why it could not be applied even for the fabrication of thin-base transistors instead of the radiation-transmission techniques earlier mentioned. Nor is there any reason why the invention cannot be used to augment rather than decrease the thickness of a desired semiconductor as, for example, by controlling the length of a jet-plating operation.

We claim:

1. Apparatus for altering the thickness of a region of a solid body from its initial thickness to a given thickness, comprising means for mechanically gauging said initial thickness of said region, means coupled to said gauging means for producing an electrical quantity the value of which depends on the magnitude of said gauged thickness, means for storing said electrical quantity, means actuatable to alter the thickness of said body, the latter means being adapted to alter said thickness of said region when said body is in a given position stationary with respect to said thickness-altering means, means for actuating said thickness-altering means when said body is stationary in said given position, means responsive to said value of said electrical quantity to maintain said thickness-altering means actuated for the time required by said thickness-altering means to alter said thickness of said region from said gauged thickness to substantially said given thickness and thereafter to deactuate said thickness-altering means, and means for supplying said stored electrical quantity from said storing means to said means responsive to said electrical quantity concurrently with the actuation of said thickness-altering means and when said body is stationary in said given position.

2. Apparatus according to claim 1, wherein said electrical quantity is a unidirectional voltage having a value directly dependent on said gauged thickness and said storing means comprise a capacitor.

3. Apparatus according to claim 1, wherein said means for producing an electrical quantity comprise means for producing a first unidirectional voltage the value of which is directly dependent on said magnitude of said gauged thickness; wherein said storing means include a capacitor and means for applying said first voltage between the terminals of said capacitor; wherein said thickness-altering means comprise means for reducing said thickness of said body region, and wherein said means responsive to said value of said quantity comprise a resistive element and a source of a second unidirectional voltage connected in series relationship, means for connecting said resistive element and source to said terminals of said capacitor in a manner such that said source applies a voltage to said capacitor by way of said resistive element in a polarity opposite that to which said capacitor is charged by said first voltage, means responsive to a control voltage to deactuate said thickness-reducing means when said control voltage has a given polarity and magnitude and means for connecting said deactuating means to said terminals of said capacitor concurrently with the connection thereto of said resistive element and said source, said capacitor, resistive element, first and second voltages having respective values such that said voltage between said terminals of said capacitor attains said given polarity and magnitude in a time just sufficient to alter said thickness of said body region from said gauged thickness to substantially said given thickness.

4. Apparatus according to claim 3, wherein said means for producing said first unidirectional voltage comprise a source of a substantially constant unidirectional voltage the magnitude of which is such as to maintain said thickness-reducing means actuated for a time just sufficient to reduce said thickness of said region from a reference thickness to substantially said given thickness, means for producing a unidirectional error voltage the magnitude of which is directly proportional to the amount by which said gauged initial thickness of said body region deviates from said reference thickness and the polarity of which is the same as that of said constant voltage when said initial thickness is greater than said reference thickness and is opposite that of said constant voltage when said initial thickness is less than said reference thickness, and means for adding said constant voltage and said error voltage.

5. Apparatus according to claim 1, wherein said body is composed of a semiconductive material and wherein said thickness-altering means comprise means for jet-electrolytically etching said region of said body.

6. A system for reducing to a given thickness the thickness of a region of each of a succession of solid bodies, comprising means for mechanically gauging the initial thickness of a region of one of said solid bodies, means coupled to said gauging means for producing between a pair of output terminals a unidirectional voltage the value of which is directly dependent on the magnitude of said gauged thickness, storage means comprising at least two capacitors each having a pair of terminals, means connecting said terminals of one of said capacitors to said output terminals of said voltage-producing means thereby to charge said one capacitor to said voltage, means controllable to reduce the thickness of said one body, the latter means being adapted to reduce the thickness of said region of said one body when said one body is located at a given position stationary with respect to said thickness reducing means, and means for controlling said thickness-reducing means while said body is stationary in said given position, said controlling means comprising means operable by the placement of said one body in said given stationary position to initiate operation of said thickness-reducing means and responsive to said value of said voltage to maintain said thickness-reducing means actuated for a time just sufficient to reduce said thickness of said body region to said given thickness and thereafter to deactuate said thickness-reducing means, and means also operable by said placement of said body in said given stationary position to switch said terminals of said one capacitor from said output terminals of said voltage-producing means to input terminals of said voltage-responsive means and to connect said terminals of the other of said capacitors to said output terminals of said voltage-producing means.

References Cited in the file of this patent

UNITED STATES PATENTS

| | | |
|---|---|---|
| 2,199,396 | Dubilier | May 7, 1940 |
| 2,312,357 | Odquist | Mar. 2, 1940 |
| 2,726,202 | Rockafellow | Dec. 6, 1955 |
| 2,784,154 | Korbelak | Mar. 5, 1957 |
| 2,793,345 | Hags | May 21, 1957 |
| 2,846,346 | Bradley | Aug. 5, 1958 |
| 2,875,140 | Sikina | Feb. 24, 1959 |
| 2,886,026 | Stewart | May 12, 1959 |